PYRIDYLALKYL DICYANDIAMIDES AND GUANYLUREAS

3,074,955

Seymour L. Shapiro, Hastings-on-Hudson, and Louis Freedman, Bronxville, N.Y., assignors to U.S. Vitamin & Pharmaceutical Corporation, New York, N.Y., a corporation of Delaware
No Drawing. Filed Nov. 30, 1960, Ser. No. 72,558
6 Claims. (Cl. 260—295)

This invention is concerned with novel pyridylalkyl dicyandiamides and guanylureas of the formula shown:

$$R_1-\underset{\underset{NH}{\|}}{\overset{R_2}{N}}-C-\overset{H}{N}-Z$$

wherein $R_1$ is selected from the group consisting of picolyl and pyridylethyl, $R_2$ is selected from the group consisting of hydrogen and methyl, and Z is selected from the group consisting of cyano (to give the substituted dicyandiamides, I), and carbamido (to give the substituted guanylureas, II)

$$R_1-\underset{\underset{NH}{\|}}{\overset{R_2}{N}}-C-\overset{H}{N}-C\equiv N \qquad R_1-\underset{\underset{NH}{\|}}{\overset{R_2}{N}}-C-\overset{H}{N}-\underset{\underset{O}{\|}}{C}-NH_2$$

I          II

The compounds of this invention by virtue of their pyridine ring system can readily form salts with the non-toxic mineral acids. In addition, the guanylureas have another basic site and can be obtained as their mono- or di-acid salts.

The compounds are conveniently prepared by reaction in refluxing butanol of the appropriately substituted $R_1R_2NH$ picolyl or pyridylethyl amine hydrochloride with sodium dicyanamide, to give upon work-up, the required dicyandiamide (I). Other solvents such as propanol, or aqueous butanol may be substituted.

The dicyandiamide (I), in turn, is readily hydrolyzed upon treatment with alcoholic solutions of 12 N hydrochloric acid. The preferred alcohol for this hydrolysis is isopropyl alcohol although other lower alcohols are equally applicable. After an appropriate reflux period, the product usually crystallized as the dihydrochloride of the substituted guanylurea (II).

In instances where the dihydrochloride does not precipitate, the product is conveniently isolated by adjusting the pH of the reaction mixture to approximately 5–6 and adding sodium nitrate which precipitates the guanylureas II, as the nitrate.

Equations typifying these reactions are shown:

Equation 1
$$R_1-\overset{R_2}{N}H.HCl+NaN(CN)_2 \longrightarrow I$$

Equation 2
$$I \xrightarrow{HCl} II.2HCl$$

The process of compounds of this invention will be more clearly understood from a consideration of the following examples which are given for the purposes of illustration only and are not to be considered as limiting the scope of the invention in any way.

EXAMPLE 1

General procedure for preparation of the pyridylalkyl dicyandiamides.—A solution of 0.5 mole of the appropriate picolyl or pyridylethyl amine in 500 ml. of n-butanol was treated under cooling and stirring with 42 ml. of 12 N hydrochloric acid, followed by the addition of 55.0 g. (0.5 mole) of sodium dicyanamide. The white suspension was heated under reflux for 6 hours with stirring. The hot solution was filtered to separate the formed sodium chloride and after removal of the butanol, the residue of product was recrystallized. Typical of the syntheses, reflecting this invention, are the compounds listed in Table I.

Compounds 10 and 11, which are not a part of this invention, have been prepared to demonstrate the selective and distinct properties of the compounds of this invention.

TABLE I

Picolyl and Pyridylethyl Dicyandiamides $$R_1-\underset{\underset{NH}{\|}}{\overset{R_2}{N}}-C-\overset{H}{N}-CN$$

| | | | | | | Analysis, percent | | | | | |
|---|---|---|---|---|---|---|---|---|---|---|---|
| | | | | | | Carbon | | Hydrogen | | Nitrogen | |
| No. | $R_1$ | $R_2$ | M.p., °C. | Yield,[a] percent | Formula | Calcd. | Found | Calcd. | Found | Calcd. | Found |
| 1 | 2-picolyl | H | 142–145 | [b] 48 | $C_8H_9N_5$ | 54.8 | 54.1 | 5.2 | 5.1 | 40.0 | 40.7 |
| 2 | 3-picolyl | H | 147–150 | 57 | $C_8H_9N_5$ | 54.8 | 54.6 | 5.2 | 5.4 | 40.0 | 39.8 |
| 3 | 4-picolyl | H | 78–81 | 31 | $C_8H_{11}N_5O$[c] | 49.7 | 49.9 | 5.7 | 5.7 | 36.3 | 35.7 |
| 4 | 2-picolyl | $CH_3$ | 150–152 | 39 | $C_9H_{11}N_5$ | 57.1 | 57.1 | 5.9 | 5.7 | 37.0 | 37.1 |
| 5 | 3-picolyl | $CH_3$ | 158–160 | 54 | $C_9H_{11}N_5$ | 57.1 | 57.2 | 5.9 | 6.0 | 37.0 | 37.1 |
| 6 | 2-pyridylethyl | H | 143–146 | 67 | $C_9H_{11}N_5$ | 57.1 | 57.2 | 5.9 | 6.0 | 37.0 | 37.3 |
| 7 | 4-pyridylethyl | H | 194–195 | 36 | $C_9H_{11}N_5$ | 57.1 | 57.2 | 5.9 | 6.0 | 37.0 | 37.3 |
| 8 | 2-pyridylethyl | $CH_3$ | 165–168 | [b] 66 | $C_{10}H_{13}N_5$ | 59.1 | 58.9 | 6.5 | 6.7 | | |
| 9 | 4-pyridylethyl | $CH_3$ | 202–204 | [b] 39 | $C_{10}H_{13}N_5$ | 59.1 | 58.8 | 6.5 | 6.3 | | |
| 10 | 4-pyridyl | H | 111–114 | [d] 45 | $C_7H_7N_5$ | | | | | 43.6 | 44.3 |
| 11 | $(CH_3)_2N(CH_2)_3$— | $CH_3$ | 119–121 | 36 | $C_8H_{17}N_5$ | 52.4 | 52.3 | 9.4 | 9.4 | 38.2 | 38.4 |

[a] Recrystallizing solvent is isopropyl alcohol-hexane unless otherwise shown.
[b] Recrystallizing solvent is acetonitrile.
[c] Isolated, and analyses shown as monohydrate.
[d] Recrystallizing solvent is ethanol-ether.

EXAMPLE 2

General procedure for the preparation of the picolyl and pyridylethyl guanylureas.—A suspension of 0.025 mole of the dicyandiamides described in Table I in a mixture of 12 ml. of isopropyl alcohol and 6 ml. of 12 N hydrochloric acid was heated under reflux, with stirring, over a period of 2–3 hours. When cool, the formed product as the dihydrochloride, separated and was filtered and recrystallized. In those instances wherein the product did not crystallize, the reaction mixture was diluted with water (70 ml.) and neutralized (to methyl red) with 10 N sodium hydroxide and 5.3 g. of sodium nitrate added. The precipitated mononitrate salt of the product was separated and recrystallized. The salts of the product, on suspension in water or a lower alcohol, and treatment with an equivalent quantity of base afforded the free base of the guanylurea. Typical of the compounds prepared, are those described in Table II.

TABLE II
*Picolyl and Pyridylethyl Guanylureas*

$$R_1-N(R_2)-C(=NH)-N(H)-C(=O)-NH_2 \cdot HX$$

| No. | $R_1$ | $R_2$ | HX | M.p., °C. | Yield,[a] | Formula | Analysis, percent | | | | | |
|---|---|---|---|---|---|---|---|---|---|---|---|---|
| | | | | | | | Carbon | | Hydrogen | | Nitrogen | |
| | | | | | | | Calcd. | Found | Calcd. | Found | Calcd. | Found |
| 1 | 2-picolyl | H | 2 HCl | 211 | 39[aa] | | 36.9 | 36.8 | 2.6 | 2.6 | 23.7 | 24.1 |
| 1A | 2-picolyl | H | 2 HPic[b] | 193-194 | [ab] | $C_{14}H_{14}N_8O_8$ | 37.5 | 37.7 | 4.7 | 4.3 | 32.8 | 33.0 |
| 2 | 3-picolyl | H | HNO_3 | 175-177 | 27[ab] | $C_8H_{12}N_6O_4$ | 38.6 | 39.2 | 5.4 | 5.4 | 25.0 | 24.7 |
| 3 | 2-pyridylethyl | H | 2 HCl | 198-200 | 18[ac] | $C_9H_{15}Cl_2N_5O$ | 38.6 | 38.5 | 5.4 | 5.2 | 25.0 | 24.6 |
| 4 | 4-pyridylethyl | H | 2 HCl | 220-221 | 33[ad] | $C_9H_{15}Cl_2N_5O$ | 40.8 | 40.6 | 5.8 | 6.0 | 23.8 | 23.6 |
| 5 | 2-pyridylethyl | $CH_3$ | 2 HCl | 183-184 | 35[ae] | $C_{10}H_{17}Cl_2N_5O$ | 42.3 | 43.1 | 5.7 | 5.7 | 29.6 | 29.5 |
| 6 | 4-pyridylethyl | $CH_3$ | HNO_3 | 189-191 | 32[af] | $C_{10}H_{16}N_6O_4$ | | | | | | |

[a] Recrystallizing solvent: aa=80% methanol; ab=Water; ac=Methyl cellosolve-acetonitrile; ad=Methyl cellosolve; ae=Methanol-benzene; af=Ethanol-hexane.
[b] HPic=Picric acid.

The compounds of this invention have important pharmacological properties and, in particular, the dicyandiamides (I) are relatively nontoxic compounds (LD$_{min}$ 750–1,000 mg./kg.) which are particularly active as potentiators of central nervous system depressant drugs.

By contrast, the (4-pyridyl)-dicyandiamide is toxic at 20 mg./kg. s.c. and shows no distinctive pharmacological properties.

In addition, the N-methyl-dimethylamino propyl dicyandiamide, also prepared for purposes of comparison, while having substantially little toxicity (LD$_{min}$ 1,000 mg./kg.) is without important pharmacological effect.

The pyridylalkyl guanylureas manifest their effects, particularly in lowering as well as raising blood pressure, as the groups are varied. Additionally, they potentiate as well as inhibit adrenalin significantly, as the groups are varied.

It is to be understood that it is intended to cover all changes and modifications of the examples herein chosen for the purposes of illustration which do not constitute departure from the spirit and scope of the invention.

We claim:

1. The compound

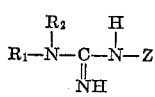

wherein $R_1$ is selected from the group consisting of picolyl, and pyridylethyl, $R_2$ is selected from the group consisting of hydrogen and methyl, and Z is selected from the group consisting of cyano and carbamido; and the nontoxic mineral acid salts thereof.

2. The compound

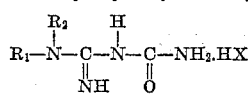

3. The compound

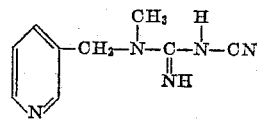

4. The compound

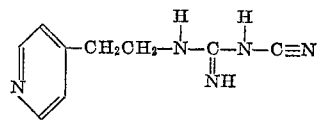

5. The compound

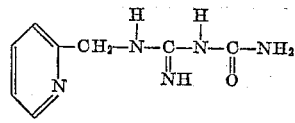

6. The compound

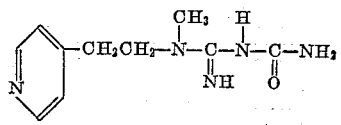

References Cited in the file of this patent
UNITED STATES PATENTS

| | | |
|---|---|---|
| 2,455,894 | Lecher et al. | Dec. 7, 1948 |
| 2,455,896 | Nagy | Dec. 7, 1948 |